United States Patent [19]

Hejazi

[11] Patent Number: 5,326,983
[45] Date of Patent: Jul. 5, 1994

[54] STORAGE PHOSPHOR CASSETTE AUTOLOADER HAVING CASSETTE SENSOR

[75] Inventor: Shahram Hejazi, Webster, N.Y.

[73] Assignee: Eastman Kodak Company, Rochester, N.Y.

[21] Appl. No.: 85,703

[22] Filed: Jun. 30, 1993

[51] Int. Cl.⁵ .................... G01N 23/00; G03B 42/02
[52] U.S. Cl. .................... 250/589; 250/590; 378/181
[58] Field of Search ........... 250/589, 590; 378/172, 378/173, 174, 181

[56] References Cited

U.S. PATENT DOCUMENTS

| Re. 32,001 | 10/1985 | Wahle . |
| 3,591,018 | 7/1971 | Nalbach . |
| 3,944,046 | 3/1976 | Kubicek . |
| 4,053,234 | 10/1977 | McFarlane . |
| 4,217,530 | 8/1980 | Dahm . |
| 4,425,042 | 1/1984 | Smith . |
| 4,456,239 | 6/1984 | Yamaguchi . |
| 4,595,294 | 6/1986 | Ohki et al. . |
| 4,680,806 | 7/1987 | Bolza-Schünemann . |
| 4,723,074 | 2/1988 | Kimura . |
| 4,806,773 | 2/1989 | Hiraga et al. . |
| 4,839,526 | 6/1989 | Pryor . |
| 4,874,939 | 10/1989 | Nishimoto et al. . |
| 4,893,011 | 1/1990 | Bauer et al. . |
| 4,908,514 | 3/1990 | Bauer et al. . |
| 5,013,927 | 5/1991 | Tsikos et al. . |

FOREIGN PATENT DOCUMENTS

| 62-183448 | 8/1987 | Japan ................................ 250/589 |
| 62-183447 | 11/1987 | Japan ................................ 250/589 |
| 2-278252 | 11/1990 | Japan . |
| 4-32829 | 4/1992 | Japan . |
| 4-42221 | 12/1992 | Japan . |
| 4-42222 | 12/1992 | Japan . |

Primary Examiner—Paul M. Dzierzynski
Assistant Examiner—Drew A. Dunn
Attorney, Agent, or Firm—William F. Noval

[57] ABSTRACT

An autoloader for positioning cassettes relative to a storage phosphor reader (i.e. stimulable phosphor). A capacitive sensor located at one or more cassette retaining sites of the autoloader senses the presence of a cassette at the site.

6 Claims, 6 Drawing Sheets 5,326,983

STORAGE PHOSPHOR CASSETTE AUTOLOADER HAVING CASSETTE SENSOR

FIELD OF THE INVENTION

The present invention relates, in general, to equipment used in processing storage phosphors and more particularly relates to an autoloader for positioning cassettes relative to a storage phosphor reader and to a cassette sensor used therein.

BACKGROUND OF THE INVENTION

It is convenient to handle a storage phosphor within cassettes that protect the storage phosphor from extraneous light and damage. This is particularly the case for storage phosphors in which the latent x-ray image stored in the storage phosphor is read by photo electrically detecting an emitted x-ray image formed by scanning the storage phosphor with stimulating radiation. An example of such a storage phosphor reader is disclosed in U.S. patent application Ser. No. 979,970, filed Nov. 23, 1992, commonly assigned, inventors Rogers and Dhurjaty. It is desirable to retain the storage phosphor within a cassette except during actual processing. Such a storage phosphor cassette is disclosed in U.S. patent application Ser. No. 800,799, filed Nov. 27, 1991, now U.S. Pat. No. 5,296,333 entitled "X-RAY CASSETTE HAVING REMOVABLE PHOTOGRAPHIC ELEMENT" by Jeffrey C. Robertson, which is incorporated herein by reference. A hooked extractor can be used with the storage phosphor cassette to move a storage phosphor plate to and from a storage phosphor reader for processing. It is desirable to provide an apparatus to automate the presentation of such cassettes to such an extractor so that a number of cassettes could be processed in succession without attention from an operator. It is also desirable that such an apparatus be able to accurately position cassettes sequentially to simplify removal and reinsertion of the storage separate from the storage phosphor reader to permit interchange of units and reduce repair times.

In a storage phosphor reader/storage phosphor cassette autoloader system, it is desirable that the autoloader have several loading sites, a read site, and several unloading sites. Since cassettes of different sizes can be accommodated at each site, it is desirable to provide a sensor which is capable of sensing different size cassettes. It is also desirable that a cassette sensor be provided which does not result in weakening of the autoloader positioning belts, such as might be necessary if photosensors are used to sense cassettes through holes or cutouts in the belts. It is also desirable that the cassette sensor be reliable, maintenance free, inexpensive and relatively simple.

There is thus a problem in a storage phosphor reader/storage phosphor cassette autoloader system in providing a cassette sensor that is reliable, inexpensive, maintenance free and simple.

SUMMARY OF THE INVENTION

According to the present invention, there is provided a solution to the aforesaid problem of the prior art. According to an aspect of the present invention, there is provided a storage phosphor cassette autoloader comprising:

first and second endless conveyor belts, said conveyor belts being spaced apart and having a plurality of outwardly extending shelves in vertical alignment so as to define a storage phosphor cassette read site and a plurality of storage phosphor cassette retaining sites, said belts being of nonmetallic material;

a mounting assembly for movably mounting each of said conveyor belts;

a drive operatively connected to said mounting assembly for said first and second conveyor belts for driving said conveyor belts in unison to transfer cassettes in said retaining sites serially through said read site; and a capacitive sensor located at one of said read or said retaining sites on the opposite side of said belt from said shelves to sense the presence of a cassette at said site, said cassette having a metallic portion which is capable of being sensed by said sensor.

BRIEF DESCRIPTION OF THE DRAWINGS

In the detailed description of the preferred embodiment of the invention presented below, reference is made to the accompanying drawings.

DESCRIPTION OF A PREFERRED EMBODIMENT

Figure 1:
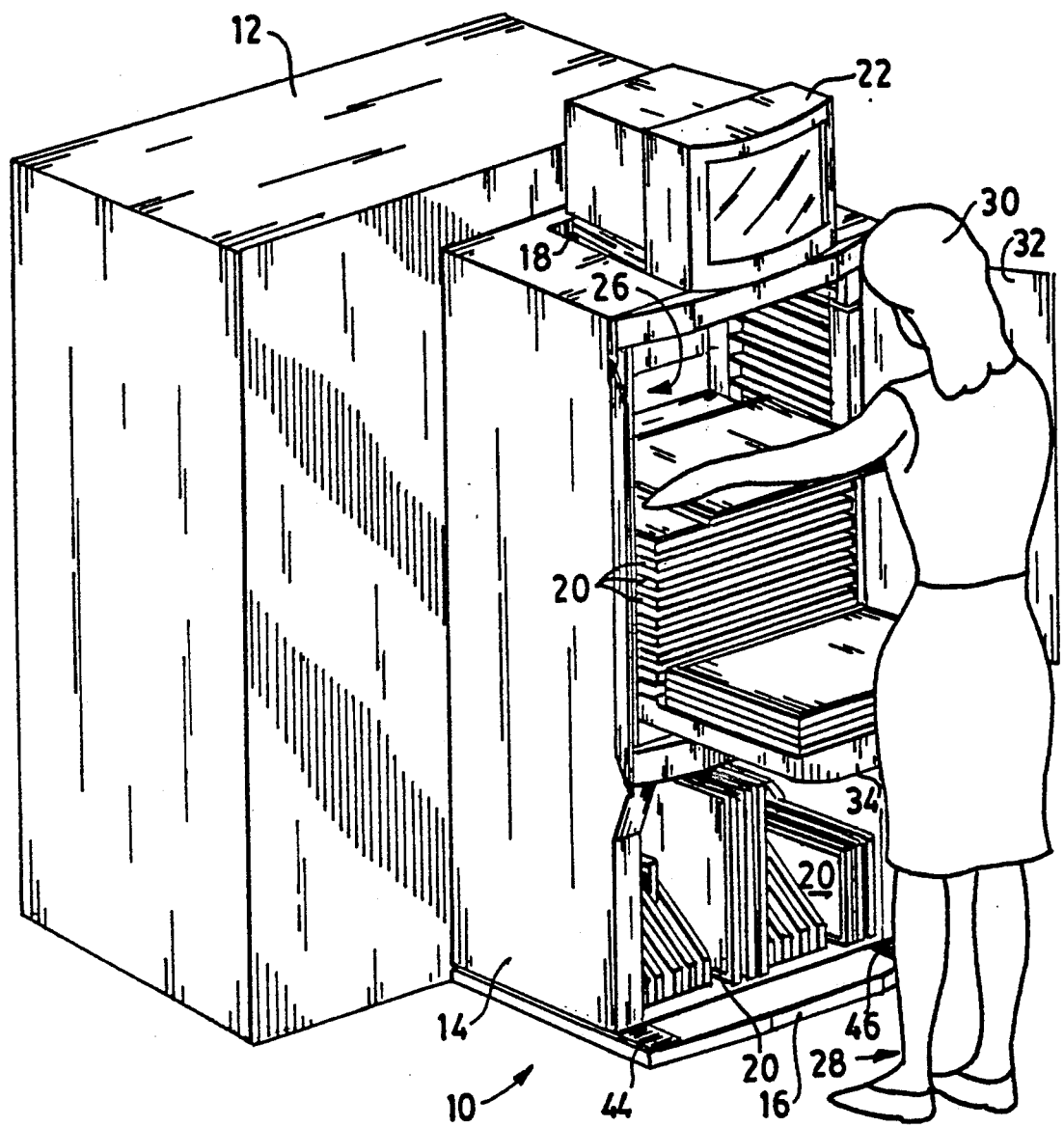
FIG. 1 is a front perspective view of a storage phosphor reader/storage phosphor cassette autoloader system incorporating an embodiment of the present invention.
Figure 2:
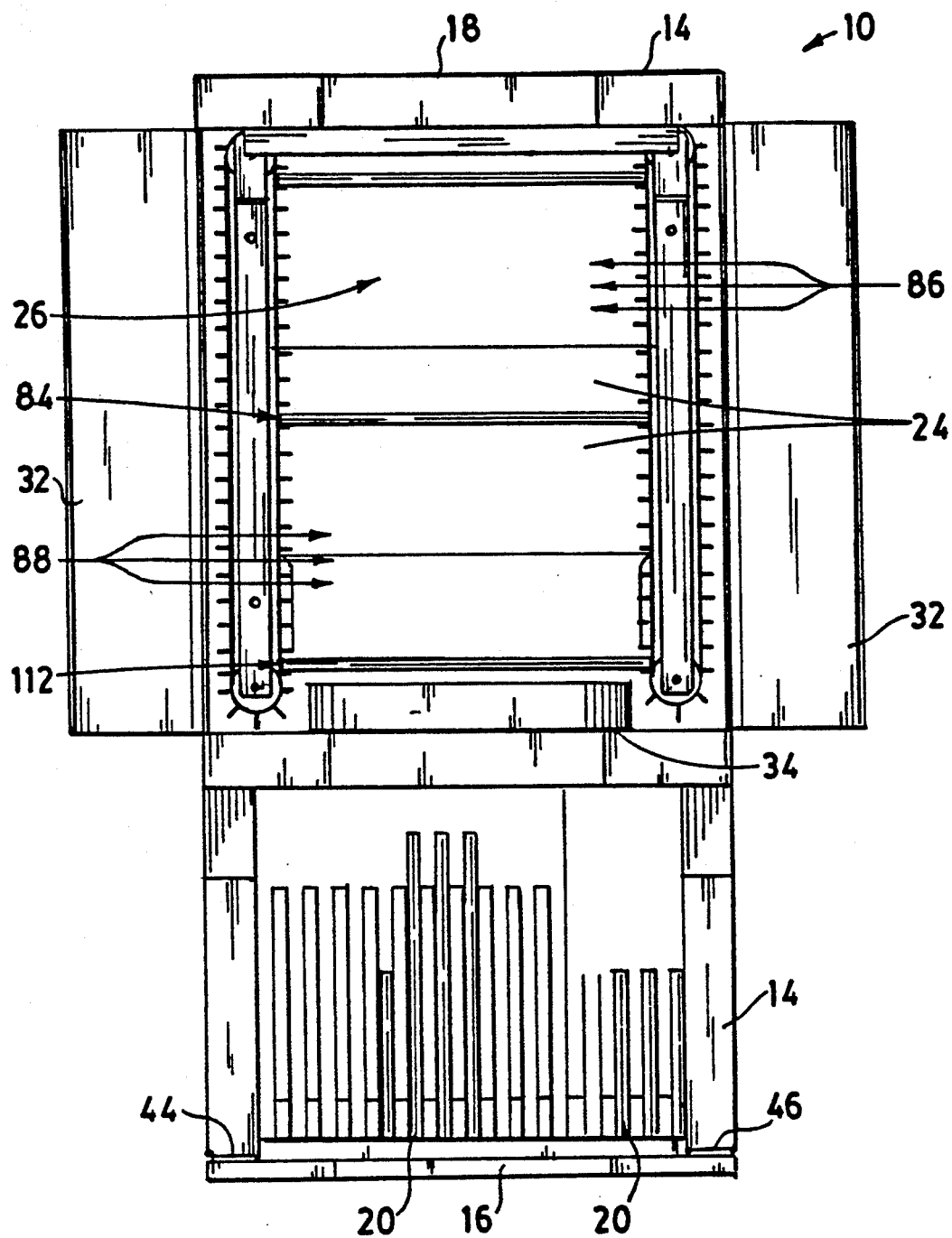
FIG. 2 is a front elevational view of the system of FIG. 1.
Figure 3:
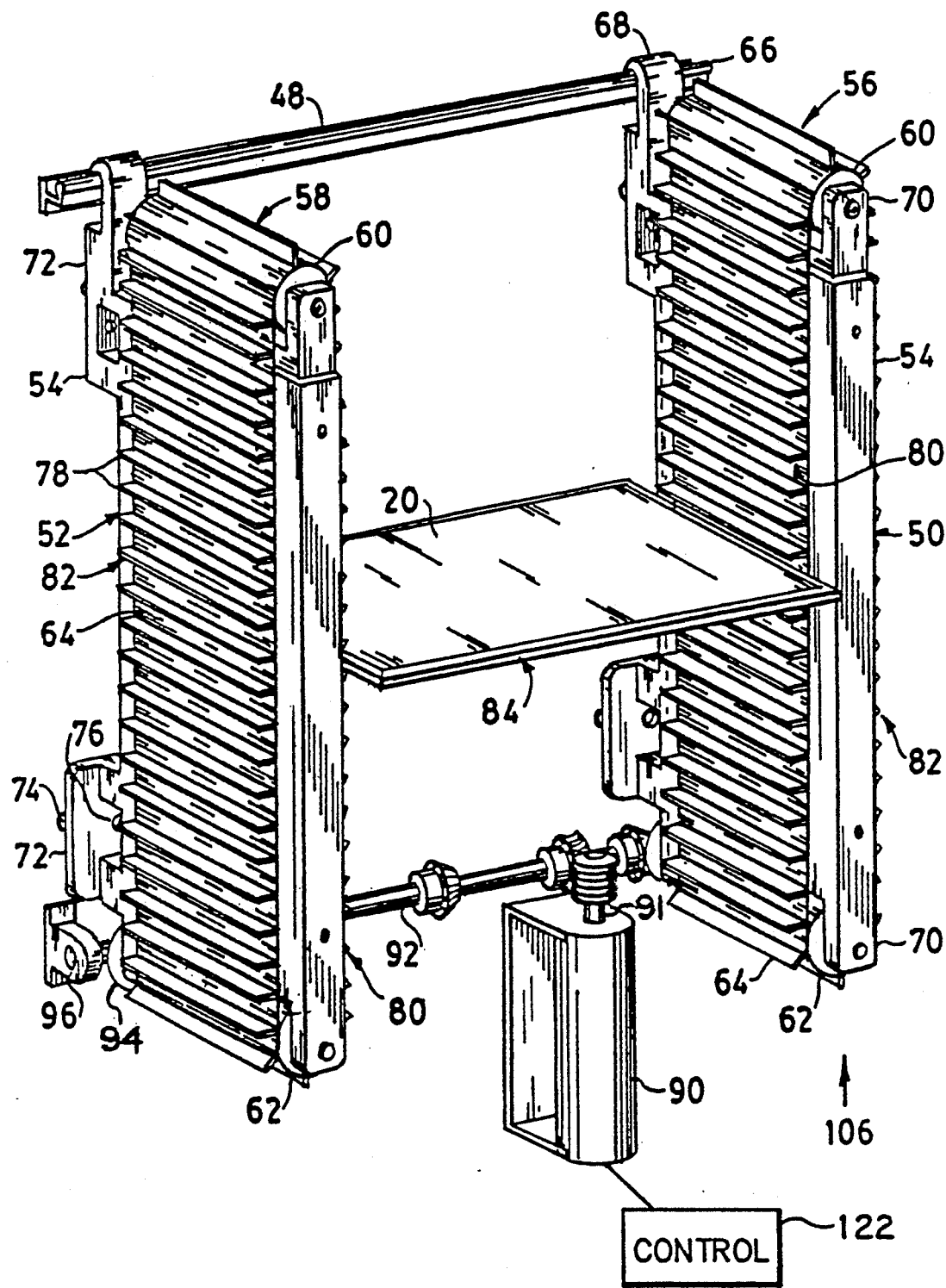
FIG. 3 is a front perspective view of the conveyor system of the autoloader of FIG. 1.

Referring to FIGS. 1, 2 and 3, storage phosphor cassette autoloader 10 is illustrated in a position directly in front of storage phosphor reader 12. Cassette autoloader 10 has a body 14 with a base 16 at the bottom and a monitor station 18 on top. Body 14 can be made of sheet metal or the like reinforced as necessary to support loads imposed by autoloader components and storage phosphor cassettes 20 such as a stimulable phosphor cassette. Monitor station 18 may include some means for preventing inadvertent movement of the monitor 22, such as an indentation. At the rear, body 14 has an access opening 24, through which can be extended an extractor or similar fixture (not shown) of reader 12. At the front, body 14 has a portal 26, which is roughly rectangular in shape and provides access to the interior of body 14. Facing portal 26 is an operator station 28, occupied by the operator 30 in FIG. 1. Doors 32 of body 14 are movable between an open position, shown in FIG. 1, in which the interior of body 14 is accessible and a closed position in which portal 26 is closed. Autoloader 10 includes a cantilevered table 34, which can be moved between a use position, shown in FIG. 1 and a storage position.

Movement of doors 32 and table 34 can be provided by suitable servomotors or the like. Table 34 can be used to hold storage phosphor cassettes 20 during loading and unloading. Alternatively, cassettes 20 can be loaded or unloaded from a cart (not shown). Foot switches 44,46 (FIG. 1) are provided to permit the operator 30 to either open the doors 32 and extend the table 34 or to only open the doors 32.

Body 14 includes a support bar 48, from which hang first and second conveyor assemblies 50,52, respectively. Each conveyor assembly 50,52 has a rack 54 and, mounted on the rack 54, a conveyor 56,58, respectively. First and second conveyors 56, 58 each have an upper wheel, such as cogwheel 60, a lower wheel, such as cogwheel 62, and an endless conveyor belt, such as cogbelt 64, all respectively.

Support bar 48 is a rigid extrusion attached to the back of body 14 near the top by fasteners or the like. Support bar 48 has a protruding flange 66 which receives hook portions 68 of racks 54. Racks 54 are rigid members which have a sheaf portion 70 at each end for respective cogwheels 60,62. At the rear, racks 54 each have a pair of attachment portions 72. Each attachment portion 72 includes one or more positioning pins 74 and a hole 76 for a bolt or other fastener. Racks 54 can be recessed between attachment portions 72 to inset racks 54 from access opening 24.

Cogbelts 64 extend over racks 54 between cogwheels 60,62. Extending outward on cogbelts 64 are regularly spaced shelves 78. Cogbelts 64 can be chains, in which case, cogwheels 60,62 are sprockets, however, it is desirable that cogbelts 64 be timing belts and cogwheels 60,62 be toothed timing belt pulleys. The cogbelts 64 are made of a nonmetallic polymeric or reinforced polymeric material.

Conveyor assemblies 50,52 are each oriented with their longest dimensions vertical. Cogbelts 64 are separated for almost their entire lengths by a distance slightly larger than one of the dimensions of a standard size storage phosphor cassette. Cogbelts 64 have utilization segments 80 that face each other and return segments 82 that face to the outside. Shelves 78 of utilization segments 80 of cogbelts 64 define a sequence of vertically arranged cassette sites 84,86,88 (FIG. 2) within body 14. In line with the center of access opening 24 is a read site 84. A cassette 20 within read site 84 can be accessed by a reader 12. For example, a pair of vertically separated jaws (not shown) could extend from reader 12 and grip cassette 20 allowing an extractor (not shown) to engage and remove a storage phosphor 20. Above read site 84 are a number of loading sites 86, preferably ten or more, into which cassettes 20 may be slid by the operator 30. Cassettes 20 can be interchanged between loading sites 86 easily as needs change, since each cassette 20 is individually supported by a pair of vertically aligned shelves 78 and cassettes 20 are spaced apart from each other by a distance sufficient to permit each individual cassette 20 to be gripped while positioned fully to the back of a respective cassette site 84,86,88. Below read site 84 are a series of unloading sites 88, preferably ten or more, from which cassettes 20 may be unloaded at the convenience of the operator 30 or as needs warrant.

Both conveyors 56,58 are driven in unison by a positive drive 90. Positive drive 90 moves cogbelts 64 by increments equal to the vertical thickness of a cassette site 84,86,88. Positive drive 90 has geared shaft 91 engaging a geared driveshaft 92, which engage a pair of primary gears 94. Driveshaft 92 is supported at each end by bearing blocks 96. The Figures show primary gears 94 each fixed to the rear end of a lower cogwheel 62 of a respective conveyor 56,58. Primary gears 94 can be positioned in alternate ways, for example, primary gears 94 can be fixed to respective upper cogwheels 60. Primary gears 94 can be made removable for repairs.

Motor 90 is actuated by reader 12 based upon the readiness of reader 12 for cassette 20. Reader 12 sends a signal to a control 122, which actuates conveyors 56,58. Provision of the signal may take a variety of means known to those skilled in the art, for example, reader 12 may direct a light beam at a photodetector wired to stepper motor controller. When actuated, motor 90 drives conveyors 56,58 an increment at a time to shift loaded cassettes 20 downward in steps equal to the separation between cassette sites 84,86,88. Reader 12 accesses each cassette 20 as cassette 20 is presented in read site 84. When a cassette 20 reaches the lowermost unloading site 112 (FIG. 2), a switch (not shown) is actuated by the cassette 20, stopping further movement of conveyors 56,58. The switch can be, for example, a mechanical pressure switch or an optical switch actuated by the interruption of a beam.

FIG. 3 illustrates first conveyor 56 in a first position 106, with a standard size large cassette (for example, 14 inches by 17 inches (about 35.5 centimeters by 43.2 centimeters)) registered in read site 84. Smaller cassettes could be used with first conveyor 56 in this first position 106 by using the smaller cassettes with adapters or pallets (not shown) sized to match a larger size cassette. First conveyor 56 can alternatively be moved to a second position closer to conveyor 58.

As an example, cogbelt 64 is a timing belt of nonmetallic material, such as polyurethane, having the dimensions: 150 centimeters long 9.5 inches wide (about 24.1 centimeters), 1 tooth/centimeter. Shelves 78 extend outward 1.5 centimeters and are uniformly spaced apart by a separation of 3 centimeters. In this example, there are ten loading sites 86, and ten unloading sites 88. There is cassette storage within body 14 below portal 26 and monitor station 18 is less than five feet (about 1.5 meters) above base 16 of body 14.

In use, the operator 30 brings one or more storage phosphor cassettes 20 to autoloader 10 by hand or on a cart. Operator 30 then opens the doors 32 by actuating foot switch 44 and, at the operator's option extends table 34 by actuating foot switch 46. Operator 30 lifts cassettes 20 with both hands and places them in loading sites 86. The order in which loading sites 86 are loaded is at the option of the operator 30. Table 34 is moved to a storage position, doors 32 are closed and autoloader 10 is prepared to operate. Autoloader 10 does not move conveyors 56,58 until a signal is received from reader 12, which causes cassettes 20 to each step downward to the next lower cassette site 84,86,88. When a cassette 20 has been positioned in read site 84, reader 12 acts on that cassette 20, by extracting the storage phosphor from cassette 20 and processing the storage phosphor. The storage phosphor is then returned to cassette 20, cassette 20 is returned to belts 56,58 and autoloader 10 is again signaled to move cassettes 20 downward by an increment. This continues until operator 30 again opens doors 32 and loads or unloads cassettes 20 or until a cassette 20 reaches the lowermost unloading site 112, at which time further movement of conveyors 56,58 is halted.

Figure 4:
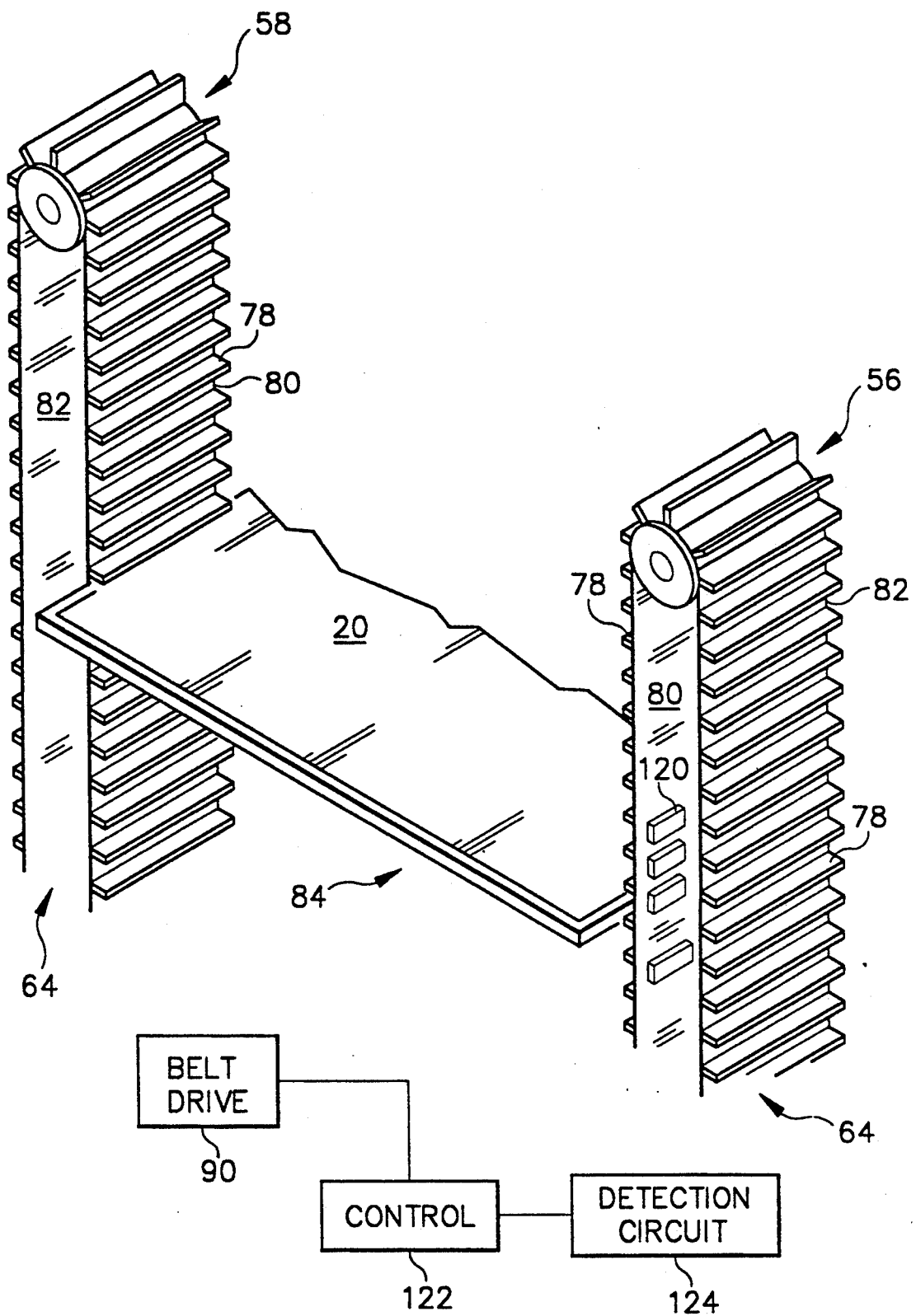
FIG. 4 is a partial perspective view of the conveyor system including cassette sensors at cassette sites.

According to the present invention, there is provided a detection system that can sense the cassette 20 at one or more of the cassette reading sites and loading/unloading sites. As shown in FIG. 4, cassette sensors 120 are located at read site 84 and retaining sites above and below read site 84. Sensors 120 are located on the opposite side of belt 64 from shelves 78. Sensors 120 are capacitive sensors that sense the presence of metallic portions of cassette 20 through nonmetallic belt 64. Sensor 120 produces a cassette present signal which is processed by detection circuit 124 which produces a signal sent to control 122. Control 122 can control belt drive 90 as a function of such a signal. Control 122 can also produce an operator observable signal which indicates at which sites of autoloader 10 cassettes 20 are located.

Figure 5:
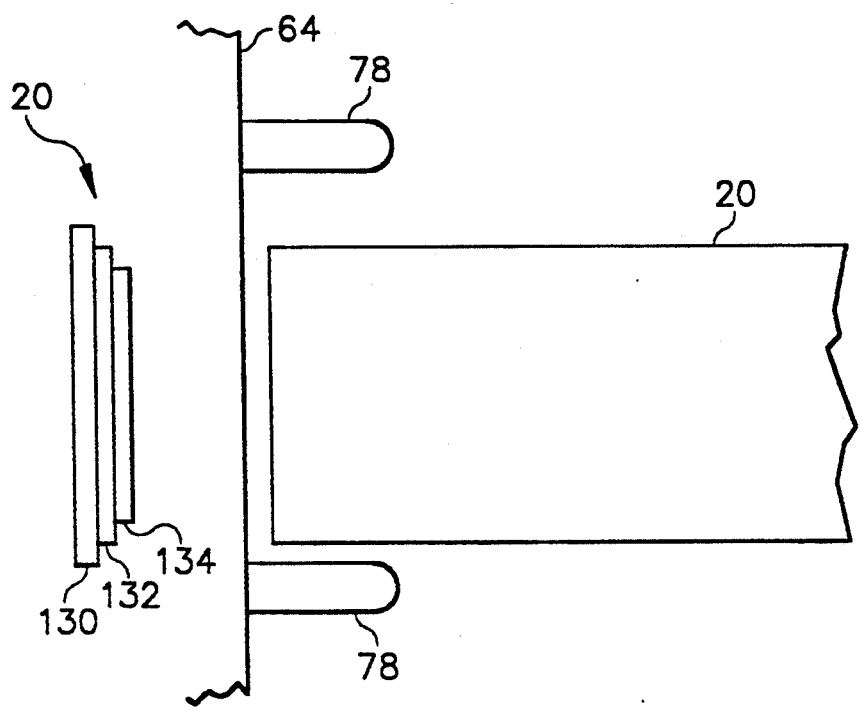
FIG. 5 is a diagrammatic view of one type of cassette sensor at a cassette site.

FIG. 5 illustrates one embodiment of capacitive sensor 120. As shown, sensor 120 includes a conductive base 130, insulator 132 and an electrically conductive capacitive sensing element 134. Sensor 120 is located on the opposite side of nonmetallic belt 64 from shelves 78 holding cassette 20. Cassette 20 has a metallic portion at least in the region near sensor 120. When no cassette is present, sensor 120 has a fixed capacitance. When the metallic portion of cassette 20 is near sensor 120, its capacitance changes. This capacitance change is detected by detection circuit 124.

Figure 6:
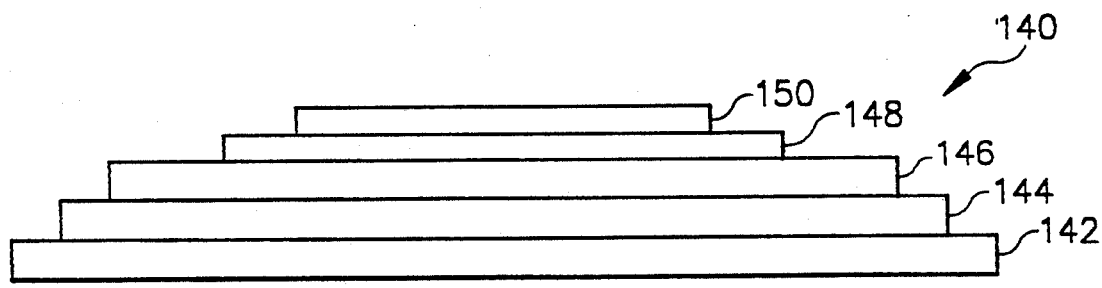
FIG. 6 is a diagrammatic view of another type of cassette sensor.

Referring now to FIG. 6, there is shown another embodiment of capacitive sensor which is more sensitive and has greater sensing range than the embodiment shown in FIG. 5. As an example, sensor 120 has a sensing range of about two inches (about 5 centimeters) while sensor 140 has a range of six inches (about 15 centimeters). As shown, capacitive sensor 140 includes a conductive base 142, first insulator 144, conductive shield 146, second insulator 148 and conductive capacitive sensing element 150. Base 142 is connected to ground while shield 146 and sensing element 150 are connected to the same voltage potential, shield 146 through a voltage follower circuit.

Figure 7:
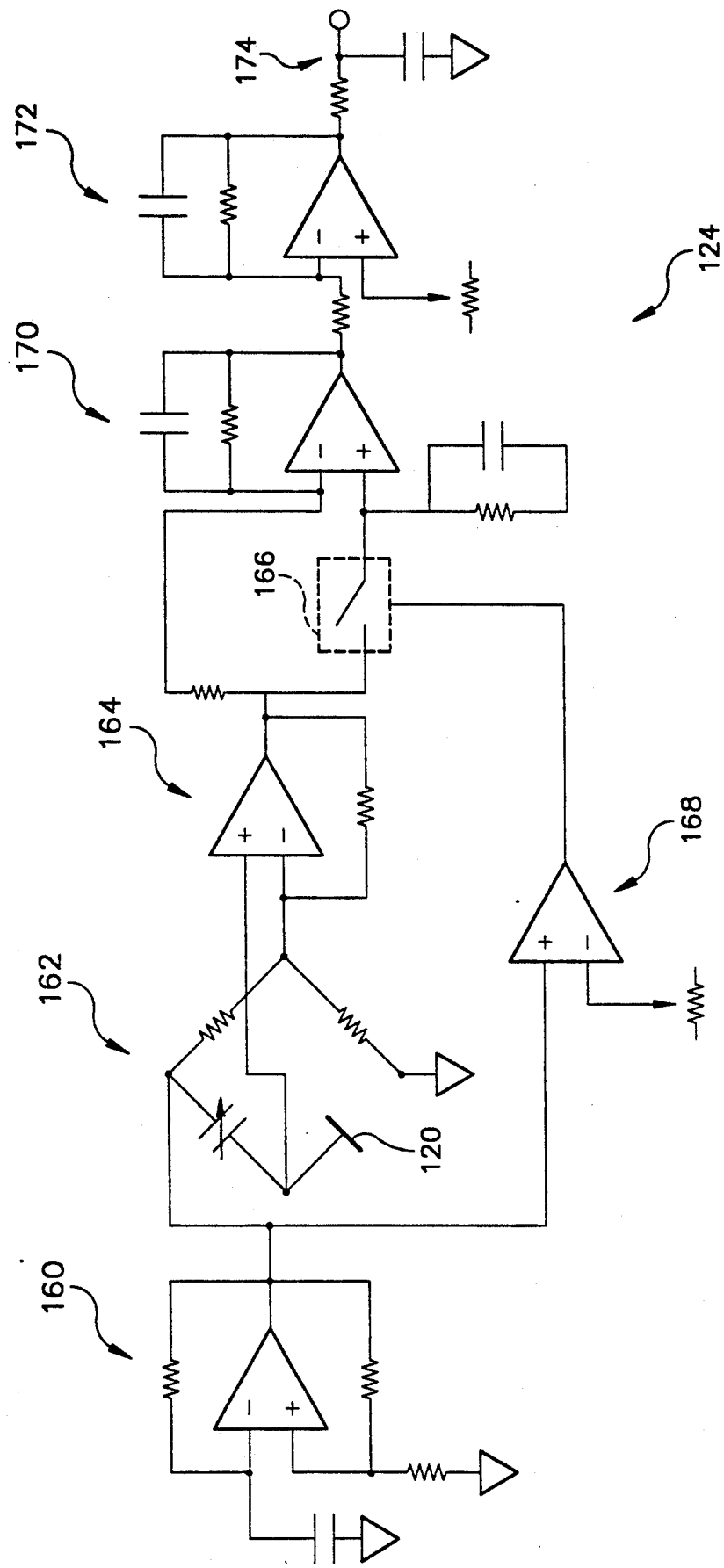
FIG. 7 is a schematic diagram of a sensing circuit.

A preferred embodiment of sensing circuit 124 is shown in FIG. 7 as used with capacitive sensor 120. As shown, detection circuit 124 includes a modulation section and a demodulation section. The modulation section includes oscillator 160, balanced bridge 162 having capacitive sensor 120, and amplifier 164. The demodulation section includes switch 166 driven by driver 168, differential amplifier 170, offset circuit 172 and low pass, filter 174. Driver 168 turns switch 166 on and off at a specific phase of the signal at the output of amplifier 164. Capacitive sensor 120 has a set capacitance value such that when no cassette 20 is sensed by sensor 120, there is no output from differential amplifier 170. Any change in the capacitance of sensor 120, caused by sensing of a cassette 20, modulates the sinusoidal signal produced by oscillator 160 and produces a large signal at the output of differential amplifier 170. The demodulation section separates the useful sensor signal from signal noise. The cassette presence signal at the output of filter 174 is sent to control 122 for further processing.

The present invention finds application in medical imaging systems, especially in a storage phosphor reader/storage phosphor cassette autoloader x-ray imaging system and used with stimulable phosphors.

Although the invention has been described with reference to preferred embodiments thereof, it will be understood that variations and modifications can be effected within the spirit and scope of the invention as described above and as defined in the appended claims.

What is claimed is:

1. A storage phosphor cassette autoloader comprising:
   first and second endless conveyor belts, said conveyor belts being spaced apart and having a plurality of outwardly extending shelves in vertical alignment so as to define a storage phosphor cassette read site and a plurality of storage phosphor cassette retaining sites, said first and second conveyor belts being of nonmetallic material;
   a mounting assembly for movably mounting each of said first and second conveyor belts;
   a drive operatively connected to said mounting assembly for said first and second conveyor belts for driving said first and second conveyor belts in unison to transfer cassettes in said retaining sites serially through said read site; and
   a capacitive sensor located at one of said read or said retaining sites on the opposite side of one of said first and second conveyor belts from said shelves to sense the presence of a cassette at said read or retaining sites, said cassette having a metallic portion which is capable of being sensed by said sensor.

2. The autoloader of claim 1 including a detection circuit including said capacitive sensor for developing a sensor signal when said sensor senses a cassette at said read or retaining sites.

3. The autoloader of claim 1 wherein said capacitive sensor includes an electrically conductive base, an insulator and an electrically conductive capacitive sensing element.

4. The autoloader of claim 1 wherein said capacitive sensor includes an electrically conductive base, a first insulator, a conductive shield, a second insulator and an electrically conductive capacitive sensing element.

5. The autoloader of claim 2 wherein said detection circuit includes a modulation section for modulating an oscillating signal with said sensor signal and a demodulation section for separating said sensor signal from noise to produce a noise free cassette presence signal.

6. The autoloader of claim 5 wherein said modulation section of said detection circuit includes an oscillator for producing an oscillating signal and a balanced bridge, including said capacitive sensor, for modulating said oscillating signal with said sensor signal.

* * * * *